June 18, 1940.  G. L. CLINGERMAN  2,204,926
MOTORBUS CONSTRUCTION
Filed Nov. 29, 1939  4 Sheets-Sheet 1

Inventor
G. L. Clingerman

By Clarence A. O'Brien
and Hyman Berman
Attorneys

June 18, 1940.   G. L. CLINGERMAN   2,204,926
MOTORBUS CONSTRUCTION
Filed Nov. 29, 1939   4 Sheets-Sheet 2
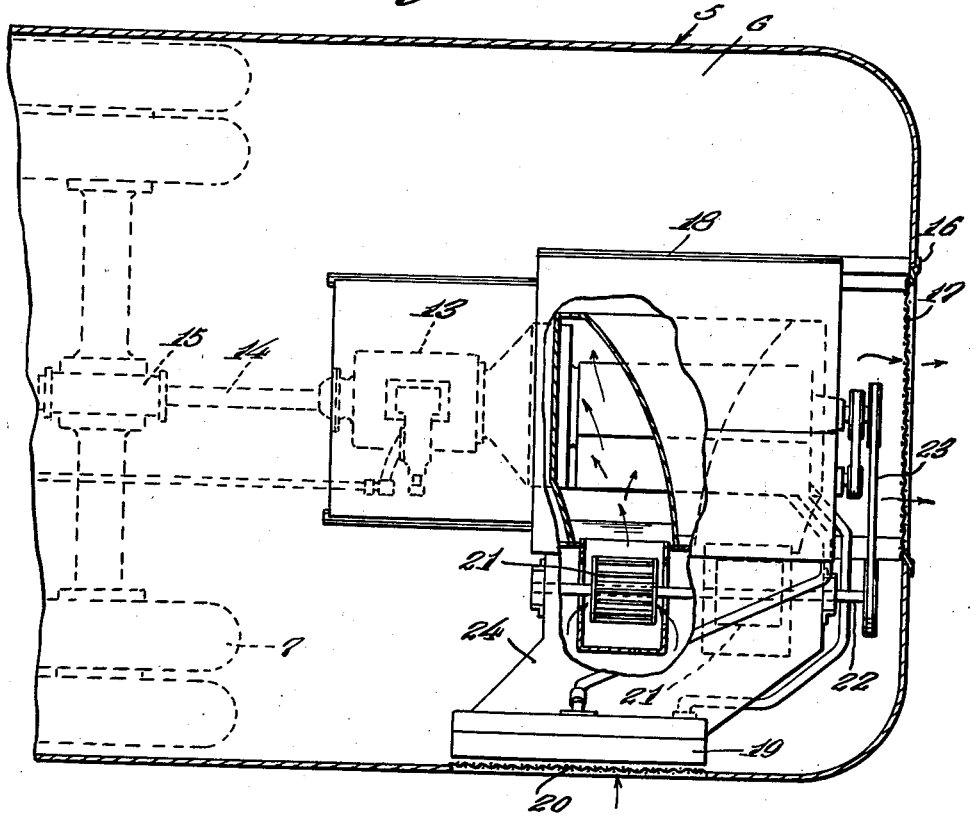
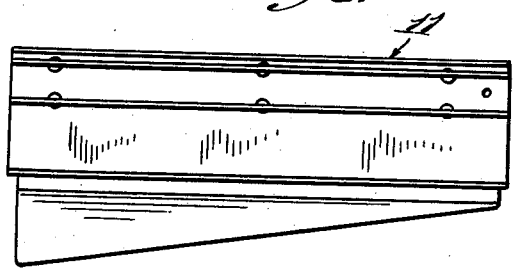
Inventor
G. L. Clingerman
By Clarence A. O'Brien
and Hyman Berman
Attorneys June 18, 1940.   G. L. CLINGERMAN   2,204,926
MOTORBUS CONSTRUCTION
Filed Nov. 29, 1939   4 Sheets-Sheet 3
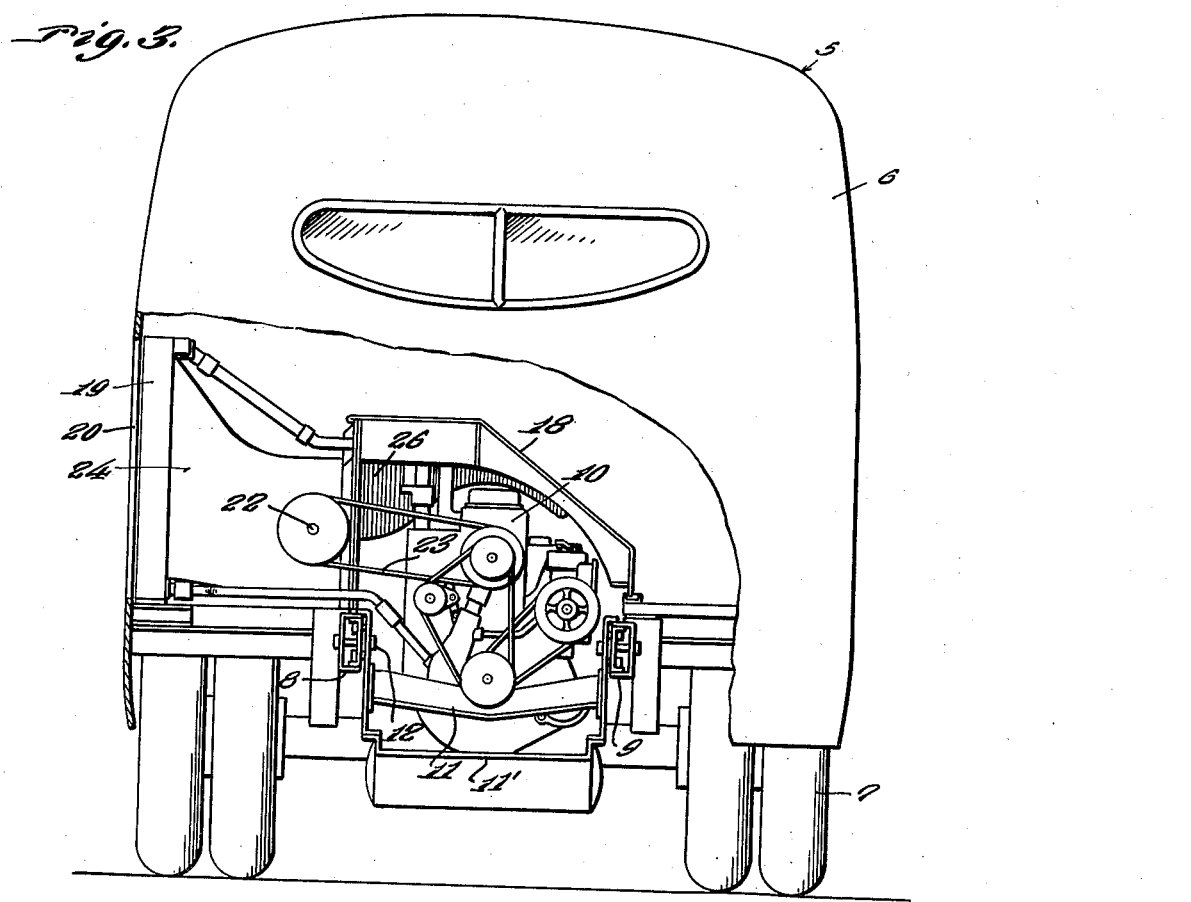
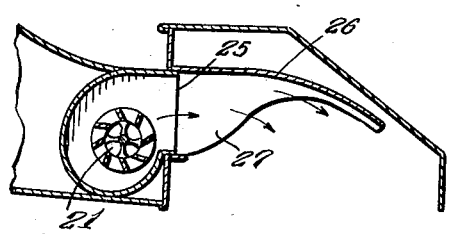
Inventor
G. L. Clingerman
By Clarence A. O'Brien
and Hyman Berman
Attorneys June 18, 1940.  G. L. CLINGERMAN  2,204,926
MOTORBUS CONSTRUCTION
Filed Nov. 29, 1939  4 Sheets-Sheet 4
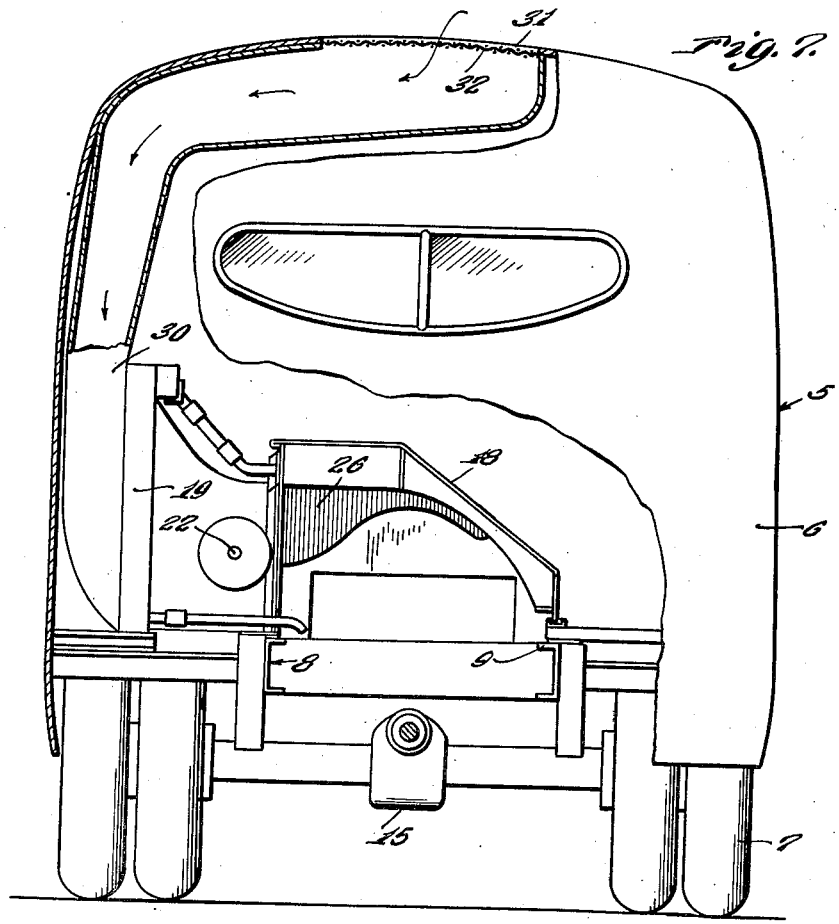
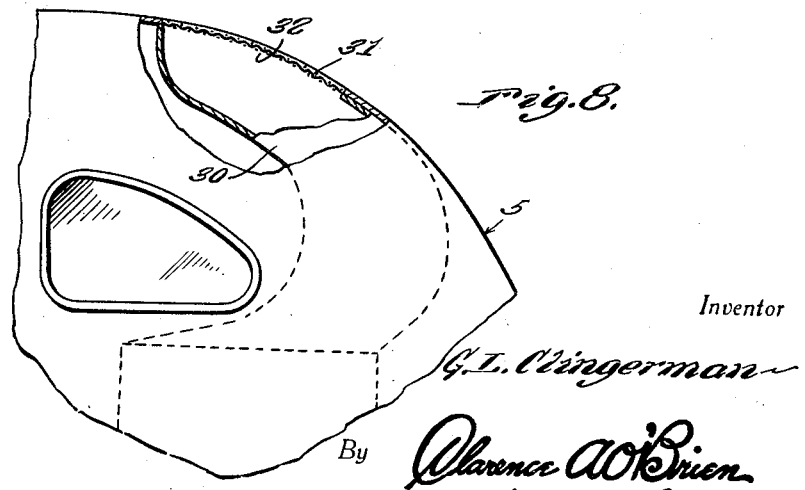
Inventor
G. L. Clingerman
By Clarence A. O'Brien
and Hyman Berman
Attorneys Patented June 18, 1940

2,204,926

UNITED STATES PATENT OFFICE 2,204,926

MOTORBUS CONSTRUCTION

George L. Clingerman, Bellefontaine, Ohio

Application November 29, 1939, Serial No. 306,730

5 Claims. (Cl. 180—54)

This invention relates to a motorbus construction and more particularly to the mounting of the engine and the cooling thereof and the arrangement of the engine compartment in the body of the bus, and has for the primary object the provision of a construction which will permit the mounting of the engine rearwardly of the rear wheels of the bus and in alignment with the longitudinal axis of said bus and the locating of the cooling radiator in close proximity to an air entrance in the side of the bus body and the arrangement of an air circulating fan driven by the engine between the radiator and said engine to draw air through the radiator for maximum cooling thereof and to exhaust the air over the engine into the engine compartment for exhaust at the rear of the bus body, thereby assuring better balance of the bus due to the engine location and maximum cooling of said engine and complete scavenging of the engine compartment of heat and gases without the possibility of said gases reaching the passenger compartment of the bus.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation of a motor bus with a portion broken away showing the engine mounting and the cooling thereof.

Figure 2 is a fragmentary longitudinal sectional view illustrating the engine mounting and the cooling means therefor.

Figure 3 is a rear elevation partly broken away showing the rear end of the bus and the engine mounting and the cooling means therefor.

Figure 4 is a fragmentary vertical sectional view illustrating a portion of the cooling means for the engine and the engine compartment.

Figure 6 is a side elevation, illustrating an engine mounting carriage.

Figure 7 is a rear elevation, partly in section, showing the rear end of a motorbus with a modified form of my invention installed therein and with the engine removed.

Figure 8 is a fragmentary side elevation showing the air inlet conduit of the modified form of my invention within a portion of the bus body.

Figure 1:
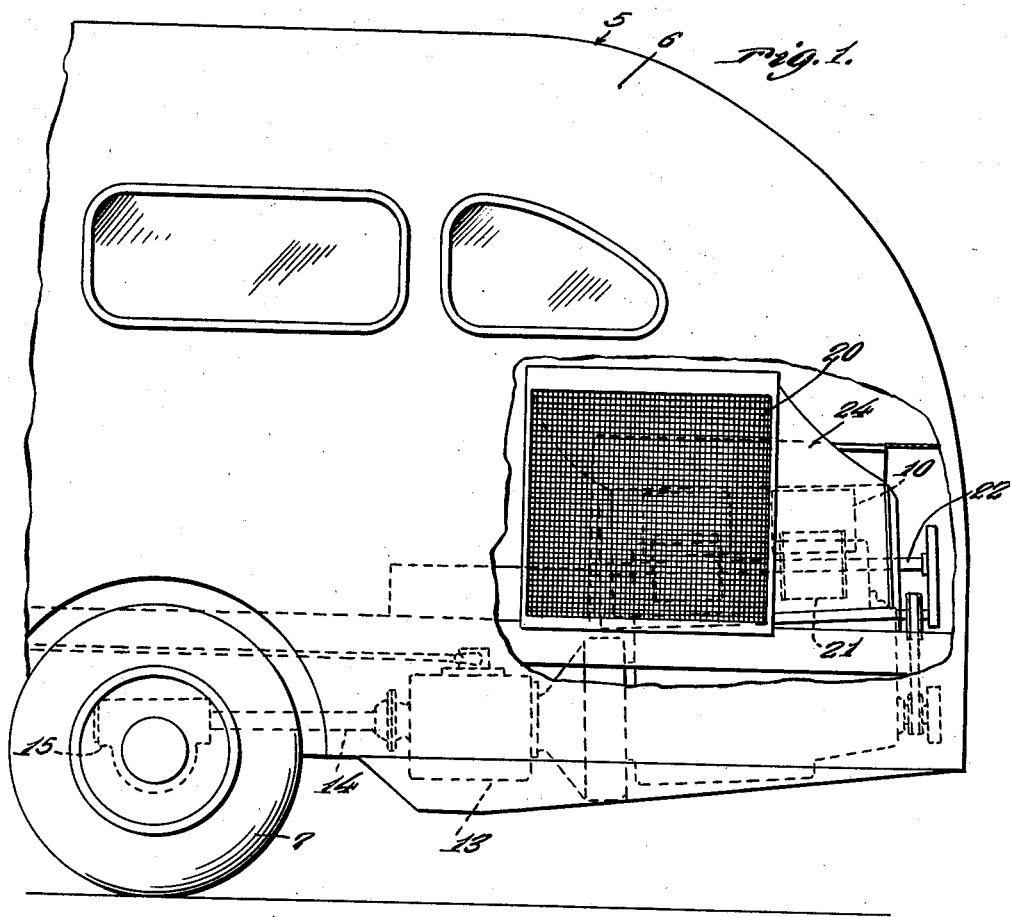
Figure 5:
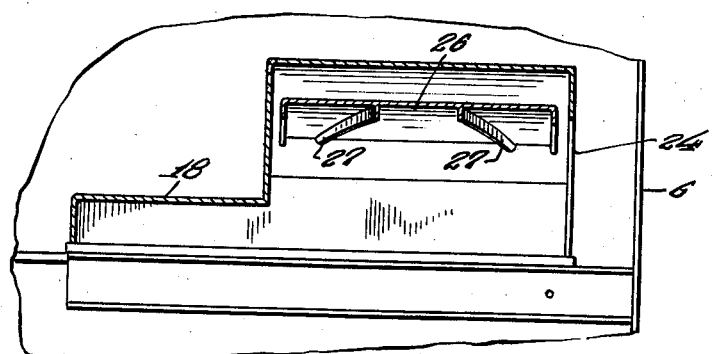
Figure 5 is a fragmentary sectional view showing the means of directing the air from the circulating fan into the engine compartment over the engine.

Referring in detail to the drawings, the numeral 5 indicates generally a fragmentary portion of a motorbus, 6 the body of the bus and 7 the rear wheels.

The trend of motorbus construction is to locate the engine rearwardly of the rear wheels and heretofore it has been the customary practice to arrange the engine transversely of the bus body. This manner of mounting the engine in the bus body has been found to have numerous disadvantages, first in engine installation, second it is extremely difficult to make engine repairs or adjustments, third, requiring a complicated drive mechanism between the engine and the rear wheels of the bus and other disadvantages which it is not deemed necessary to point out. The present invention simplifies engine installation and removal from the bus and its driving connection with the rear wheels. Further, it permits better operation of the cooling system of the engine as well as directing air over the engine, adding to the cooling efficiency and exhausting the engine compartment of all heat and gases to the rear of the bus body and obviating any possibility of disagreeable odors reaching the passenger compartment of the bus.

In adapting the engine in accordance with the present invention in a bus, a motor bed 8 is provided rearwardly of the rear wheels 7 and consists primarily of spaced channel iron members 9. It is proposed that the engine 10 be provided with hangers or a carriage, indicated generally by the character 11, and which may slide into the channel members 9 and be detachably secured thereto by suitable fasteners 12. The engine 10 thus mounted in the bus is arranged in alignment with the longitudinal axis of the bus and rearwardly of the rear wheels 7 so that the transmission 13 and propeller shaft 14 may extend directly from the engine to the differential 15 of the rear wheels 7. It is proposed that the rear wall of the bus body 6 be provided with an entrance 16 of a size to permit the engine to be easily slid into and out of its mounting. Normally the entrance 16 is closed by a grating 17 for the purpose of permitting gas and heat from the engine to escape at the rear of the bus body.

Mounted in the bus to overlie the engine and the transmission thereof is a casing 18 forming therein an engine compartment closed to the interior of the bus body and opens only to the entrance-way 16 so that the gases and heat may escape from the engine compartment.

The engine compartment and the engine arranged in the bus body as specified and shown in the drawings permits the radiator 19 of the cooling system of the engine to be located in close proximity to an opening 20 provided in the side of the bus body adjacent the rear wall. Arranged between the radiator 19 and the engine compartment is an air circulating fan 21 of the Sirocco type and in the present showing is of the double type wherein each fan assembly is connected to a common shaft 22 belted to the engine, as shown at 23. A conduit or shroud 24 extends from the radiator 19 to the fan so that the suction of the fan will draw air through the radiator to efficiently cool the fluid passing therethrough. The fan being of the double type has a pair of exhaust ports 25 connected with a hood 26 extending into the engine compartment and over the engine 10 and includes curved deflectors 27 for directing the exhaust air from the fan both rearwardly and forwardly in the engine compartment to bring about further cooling of the engine from that obtained by the ordinary cooling system and a complete scavenging of the engine compartment of gases and heat at the rear of the bus body.

The engine being mounted as specified to have the advantages mentioned also permits the use of the specified type of fan or blower which requires less horse power for the operation thereof than the type of fan employing radial type blades and also permits the location of the fan or blower so as to have the most efficient effect on cooling the radiator and engine and scavenging of the engine compartment of gases and heat. Through this arrangement of air circulation the radiator receives the cool air directly from the outside of the bus body so as to more efficiently cool the fluid passing through said radiator and the exhaust of the air from the blower or fan further cools the engine by coming directly in contact therewith and clears the engine compartment of gases and heat to prevent such from reaching the passenger compartment of the bus body.

Referring to my modified form of the invention, to permit of a more compact arrangement of the radiator 19 with respect to the engine or engine compartment, it can be positioned a selected distance from one side wall of the bus body and have connected thereto a shroud 30 in the form of a conduit extending to an opening 31 provided in the roof of the bus body. Suitable grating 32 is arranged in the opening 31 so as to trap dust and other foreign matter but which will permit the air to pass through the conduit and the radiator by the suction of the fan or blower.

From the foregoing description taken in connection with the accompanying drawings it will be seen that it is a very simple matter to remove an engine from its bed through the rear entrance of the bus body and to install the engine in said bed when desired. Also the rear entrance is of such a size that minor adjustments can be conveniently made to the engine within the engine compartment by a person standing at the rear of the bus. The complete installation of the engine cooling system and air circulating medium permits of a more compact arrangement of parts with the engine located in alignment with the longitudinal axis of the bus providing a better balance to the latter.

The carriage 11 of the engine includes a lower pan-like construction 11' which underlies the engine and transmission and coacts with the casing 18 to complete the engine compartment.

It is believed that the foregoing description, when taken in connection with the drawings will fully set forth the construction and advantages of this invention to those skilled in the art to which such a device relates, so that further detailed description will not be required.

Having thus described the invention, what I claim is:

1. In combination with a motorbus having a body provided with a rear opening and a second opening in a wall of the body other than the rear wall of said body, an engine mounted in said body rearwardly of rear wheels of the bus by way of the rear opening and in alignment with the longitudinal axis of the bus, a casing enclosing the engine to the interior of the body and forming an engine compartment having direct communication with the rear opening of the body, a radiator connected to the cooling system of the engine and located adjacent the second opening of the body, a conduit connecting the casing to said radiator, and a fan located in the conduit and driven by the engine for drawing air through the radiator and conduit and exhausting the air over the engine within the engine compartment and expelling the air along with heat and gases from said compartment by way of the rear opening.

2. In combination with a motorbus having a body provided with a rear opening and a second opening in a wall of the body other than the rear wall of said body, an engine mounted in said body rearwardly of rear wheels of the bus by way of the rear opening and in alignment with the longitudinal axis of the bus, a casing enclosing the engine to the interior of the body and forming an engine compartment having direct communication with the rear opening of the body, a radiator connected to the cooling system of the engine and located adjacent the second opening of the body, a conduit connecting the casing to said radiator, a blower type fan located in the conduit and driven by said engine for drawing air through the radiator and conduit and exhausting said air into the engine compartment and over the engine and forcing the air from the engine compartment by way of the rear opening, and an air deflecting means in the casing for directing air from the fan into the engine compartment to pass downwardly, rearwardly and forwardly of the engine.

3. In combination with a motorbus having a body provided with a rear opening and a second opening in a wall of the body other than the rear wall of said body, an engine mounted in said body rearwardly of rear wheels of the bus by way of the rear opening and in alignment with the longitudinal axis of the bus, a casing enclosing the engine to the interior of the body and forming an engine compartment having direct communication with the rear opening of the body, a radiator connected to the cooling system of the engine and located adjacent the second opening of the body, a conduit connecting the casing to said radiator, a blower type fan located in the conduit and driven by said engine for drawing air through the radiator and conduit and exhausting said air into the engine compartment and over the engine and forcing the air from the engine compartment by way of the rear opening, and a hood arranged in the engine compartment over the engine and connecting with the exhaust of the fan for directing air downwardly over the engine in a rearward and forward direction.

4. In combination with a motorbus having a body provided with a rear opening and a side opening, a mounting in the bus for locating an engine in alignment with the longitudinal axis of the bus and rearwardly of the rear wheels of the bus and permitting the application and removal of the engine from the bus by way of the rear opening, a casing enclosing the engine and forming an engine compartment separating the engine from the interior of the body and in direct communication with the rear opening, a radiator located adjacent the side opening and connected to the cooling system of the engine, a blower type fan driven by the engine and located between the radiator and the casing, a conduit extending from the radiator to the fan, said fan exhausting into the engine compartment, and a hood including curved deflectors intercepting the exhaust air from the fan and directing the same downwardly and rearwardly and forwardly in the engine compartment for cooling the engine and scavenging the engine compartment of heat and gases by way of the rear opening.

5. In combination with a motorbus having a body provided with an opening in the rear wall thereof and an opening in the top wall thereof, an engine removably mounted in the bus rearwardly of the rear wheels of the bus and in alignment with the longitudinal axis of the bus and removable and applicable to the latter by way of the rear opening, a casing for the engine forming an engine compartment, a radiator located adjacent the casing, a conduit connecting the radiator to the casing, a blower type fan driven by the engine and located in the conduit, and a second conduit connected to the radiator and with the opening in the top wall of the bus body.

GEORGE L. CLINGERMAN.